(12) United States Patent
Yi et al.

(10) Patent No.: US 11,623,971 B2
(45) Date of Patent: Apr. 11, 2023

(54) FREESTANDING ION GEL AND METHOD FOR PREPARING THE SAME

(71) Applicants: Research & Business Foundation Sungkyunkwan University, Suwon-si (KR); Kunsan National University Industry-University Cooperation Foundation, Gunsan-si (KR)

(72) Inventors: Gi Ra Yi, Suwon-si (KR); Min Jae Lee, Gunsan-si (KR); Tae Hui Kang, Suwon-si (KR); Yeon Ho Ahn, Suwon-si (KR); Duk Joon Kim, Suwon-si (KR)

(73) Assignees: Research & Business Foundation Sungkyunkwan University, Suwon-si (KR); Kunsan National University Industry-University Cooperation Foundation, Gunsan-si (KR)

(*) Notice: Subject to any disclaimer, the term of this patent is extended or adjusted under 35 U.S.C. 154(b) by 323 days.

(21) Appl. No.: 16/997,254

(22) Filed: Aug. 19, 2020

(65) Prior Publication Data
US 2021/0054127 A1   Feb. 25, 2021

(30) Foreign Application Priority Data
Aug. 23, 2019 (KR) .................. KR10-2019-0103416

(51) Int. Cl.
C08F 222/00 (2006.01)
C08F 222/10 (2006.01)

(52) U.S. Cl.
CPC ............................... *C08F 222/102* (2020.02)

(58) Field of Classification Search
CPC ...................................... C08K 5/3445
See application file for complete search history.

(56) References Cited

U.S. PATENT DOCUMENTS

| 2008/0029735 A1* | 2/2008 | Gin ...................... C07D 233/64 252/299.61 |
| 2009/0176915 A1* | 7/2009 | Yan ......................... C08K 5/42 252/182.28 |

FOREIGN PATENT DOCUMENTS

JP     2011-213862 A    10/2011

OTHER PUBLICATIONS

Washiro, Polymer 45 (2004) p. 1577-1582 (Year: 2004).*
Shirshova, Journal of Materials Chemistry A, 2013, 1, p. 15300-15309 (Year: 2013).*
Alvarado, Colloid Polym. Sci (2017) 295: 2243-2249 (Year: 2017).*
Ye, Yun-Sheng, et al., "Ionic liquid polymer electrolytes." *Journal of Materials Chemistry A* 1.8 (2013): (pp. 2719-2743).
Yuan, Chao, et al. "Polymerization in ionic liquid-based microemulsions." *Polymer Chemistry* 6.22 (2015): (pp. 4059-4066).

* cited by examiner

*Primary Examiner* — Robert C Boyle
(74) *Attorney, Agent, or Firm* — NSIP Law (57) ABSTRACT

Disclosed is preparation of a freestanding ion gel having high stability and high ionic conductivity based on surface-activity ionic liquids. Further, disclosed is a solid electrolyte using the ion gel. A method for preparing the freestanding ion gel include mixing a surface-activity ionic liquid having an alkyl group having 8 or greater carbon atoms, a cross-linking agent, water and oil with each other to form a bicontinuous microemulsion mixture; ii) adding an initiator to the mixture; and iii) curing the mixture using ultraviolet (UV) or thermal energy to form a freestanding ion gel.

20 Claims, 4 Drawing Sheets

FREESTANDING ION GEL AND METHOD FOR PREPARING THE SAME

CROSS-REFERENCE TO RELATED APPLICATION

This application claims the benefit under 35 U.S.C. § 119(a) of Korean Patent Application No. 10-2019-0103416 filed on Aug. 23, 2019, in the Korean Intellectual Property Office, the entire disclosure of which is incorporated herein by reference for all purposes.

BACKGROUND

1. Field

The present disclosure relates to a technique for preparing a freestanding ion gel with high stability and high ionic conductivity based on surface-activity ionic liquid. Further, the present disclosure relates to a solid electrolyte using the ion gel.

2. Description of Related Art

In order to easily treating liquid substances in a solid phase while maintaining useful properties such as low volatility and flammability, and high ionic conductivity and thermal stability of ionic liquids, various methods of solidifying ionic liquids, i.e. forming ion gels have been attempted. Conventional ion gel formation techniques have mainly used a radical polymerization reaction or added silica or nano-clay inorganic particles thereto to solidify the ionic liquid.

However, using the previously developed ion gel formation technique, the ion gel generally has a low ionic conductivity of about $10^{-6}$ to $10^{-4}$ S cm$^{-1}$. When adding greater than 10 wt. % of polymer material thereto, the ion gel exhibits a low storage modulus of only $10^3$ to $10^4$ Pa. The ion gel made of a block copolymer poly(styrene-b-ethylene oxide-b-styrene) showed a high ionic conductivity of 10'S cm$^{-1}$, but at the same time, a very low storage modulus of $10^4$ Pa.

Because of these points, there is a technique limitation in improving the physical properties of the ion gel with the existing technique, and it is difficult to apply the ion gel to a solid electrolyte. Therefore, development of a new ionic liquid solidification technique to realize the mechanical strength and ionic conductivity of the ion gel at the same time which is practically applicable to a solid electrolyte has been strongly required.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

An ion gel preparation technique proposed in accordance with the present disclosure is based on a technique for preparing phase-separated ion gel via a double continuous micro emulsion structure. This leads to a percolation structure in which ionic conductivity domains are all connected to each other over a large area beyond the limitations of the technique of solidifying the ionic liquid via the radical polymerization or addition of inorganic particles used as conventionally. Thus, the present disclosure proposes a method of simultaneously enhancing ionic conductivity and mechanical strength of the ion gel.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

A first aspect of the present disclosure provides a method for preparing a freestanding ion gel, the method comprising: i) mixing a surface-activity ionic liquid having an alkyl group having 8 or greater carbon atoms, a crosslinking agent, water and oil with each other to form a bicontinuous microemulsion mixture; ii) adding an initiator to the mixture; and iii) curing the mixture using ultraviolet (UV) or thermal energy to form a freestanding ion gel.

In one embodiment of the first aspect, i) further includes adding a surfactant to the mixture.

In one embodiment of the first aspect, the double continuity microemulsion mixture forms a percolation structure in which all of ion conductive domains are connected to each other.

In one embodiment of the first aspect, the surface-activity ionic liquid includes a combination of a cation and an anion, wherein the cation includes one selected from a group consisting of an imidazolium-based cation; a pyridinium-based cation; a piperidinium-based cation; a pyrrolidinium-based cation; an ammonium-based cation; a phosphonium-based cation; and a sulfonium-based cation, wherein the anion includes one selected from a group consisting of chloride; bromide; iodide; hexafluorophosphate; tetrafluoroborate; hexafluoroantimonate; trifluoromethanesulfonate; methylsulfate; ethyl sulfate; acetate; thiocyanate; dicyanamide; and bis(trifluoromethylsulfonyl)amide.

In one embodiment of the first aspect, the crosslinking agent includes one selected from a group consisting of di(ethylene glycol) dimethacrylate; di(trimethylolpropane) tetraacrylate; divinylbenzene; ethylene glycol dimethacrylate; trimethylolpropane triacrylate; trimethylolpropane ethoxylate triacrylate; 1,3-butanediol diacrylate 1,4-butanediol diacrylate; 1,3-butanediol dimethacrylate; 1,4-butanediol dimethacrylate; 1,6-hexanediol dimethacrylate; 1,6-hexanediol diacrylate; 1,6-hexanediol ethoxylate diacrylate; 1,10-decanediol dimethacrylate; 1,4-phenylene dimethacrylate; glycerol 1,3-diglycerolate diacrylate; neopentyl glycol diacrylate; and N, N'-methylenebiscacrylamide.

In one embodiment of the first aspect, i) further includes adding, to the mixture, a polymerizable ionic liquid having a functional group introduced thereto, thereby to improve mechanical strength of the freestanding ion gel.

In one embodiment of the first aspect, the polymerizable ionic liquid having the functional group introduced thereto includes a combination of a cation and an anion, wherein the cation includes one selected from a group consisting of 1-(2-acryloyloxyundecyl)-3-methylimidazolium; 1-methyl-3-(undec-10-enyl)-imidazolium; 1-(11-acryloyloxyundecyl)-1-methylpyrrolidinium; 3-(11-acryloyloxyundecyl)-1-ethyl-2-phenyl-imidazolium, and wherein the anion includes one selected from a group consisting of chloride; bromide; iodide; hexafluorophosphate; tetrafluoroborate; hexafluoroantimonate; trifluoromethanesulfonate; methylsulfate; ethyl sulfate; acetate; thiocyanate; dicyanamide; and bis(trifluoromethylsulfonyl)amide.

In one embodiment of the first aspect, the mechanical strength of the freestanding ion gel increases as a content of the polymerizable ionic liquid having the functional group introduced thereto increases.

In one embodiment of the first aspect, the initiator includes a photo-initiator or a thermal-initiator, wherein the photo-initiator includes one selected from a group consisting of 2-hydroxy-2-methylpropiophenone; 2-hydroxy-4'-hydroxyethoxy-2-methylpropiophenone; 1-hydroxycyclohexyl phenyl ketone; 2,2-dimethoxy-2-phenylacetophenone; 2,2-diethoxyacetophenone; 1-hydroxycyclohexyl phenyl ketone; benzophenone; 2-benzyl-2-(dimethylamino)-1-4-(4-morpholinyl)phenyl-1-butanone; diphenyl(2,4,6-trimethylbenzoyl)-phosphine oxide; 2,4,6-trimethylbenzoyl diphenylphosphine oxide; 2,4,6-trimethylbenzoyl-diphenyl phosphinate; and bis(2,4,6-trimethylbenzoyl)-phenyl phosphineoxide, wherein the thermal-initiator includes one selected from a group consisting of dibenzoyl peroxide; succinic acid peroxide; dilauroyl peroxide; didecanoyl peroxide; t-amyl peroxypivalate; t-butyl peroxypivalate; 2,5-dimethyl-2.5 bis(2-ethyl-hexanoylper oxy) hexane; dibenzoyl peroxide; 4,4'-azobis(4-cyanovaleric acid), 1,1'-azobis(cyclohexane carbonitrile), azobisisobutyronitrile; and 2,2'-azobis (2-methylpropionamidine)dihydrochloride.

A second aspect of the present disclosure provides a freestanding ion gel prepared using the method as defined above.

A third aspect of the present disclosure provides a solid electrolyte containing a freestanding ion gel prepared using the method as defined above.

A fourth aspect of the present disclosure provides a method for preparing a freestanding ion gel, the method comprising: i) mixing 1-tetradecyl-3-methylimidazolium chloride as a surface-activity ionic liquid, 6-hexanediol diacrylate as a crosslinking agent, water and oil with each other to form a bicontinuous microemulsion mixture; ii) adding 2-hydroxy-2-methylpropiophenone as a photo-initiator to the mixture; and iii) curing the mixture using ultraviolet (UV) curing to form a freestanding ion gel.

In one embodiment of the fourth aspect, i) further includes adding, to the mixture, a polymerizable ionic liquid having a functional group introduced thereto, thereby to improve mechanical strength of the freestanding ion gel, wherein the polymerizable ionic liquid having the functional group introduced thereto includes 1-(2-acryloyloxyundecyl)-3-methylimidazolium bromide.

Effects of the present disclosure are as follows but are not limited thereto.

The present disclosure provides an ion gel formation technology based on a self-assembly mechanism as not previously reported. Therefore, a new ion gel produced based on the mechanism provided in the present disclosure may be applicable to a solid electrolyte.

The novel ion gel formation approach provided from the present disclosure may provide a phase separation ion gel preparation technique by which ion mobility of the freestanding ion gel as formed may be maintained and the mechanical strength thereof may be enhanced due to the polymer support layer, thereby to achieve the ionic conductivity and mechanical strength of the ion gel at the same time. Further, the novel ion gel formation approach provided from the present disclosure may control an internal structure of the ion gel based on the constituent components, the composition ratio, the external conditions, etc., thereby designing the material to be adapted to have desired physical properties. Thus, the novel ion gel formation approach provided from the present disclosure may greatly contribute to the practical application of the ion gel to the solid electrolyte.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to a technique for preparing a freestanding ion gel having a high stability and a high ionic conductivity based on a surface-activity ionic liquid. Specifically, a double-continuous microemulsion is formed with a surface-activity ionic liquid having a long alkyl group (alkyl group having 8 or greater carbon atoms). A crosslinking agent is added to the double-continuous microemulsion to prepare a freestanding ion gel having interconnected ion channels over a large area via curing.

Figure 1A:
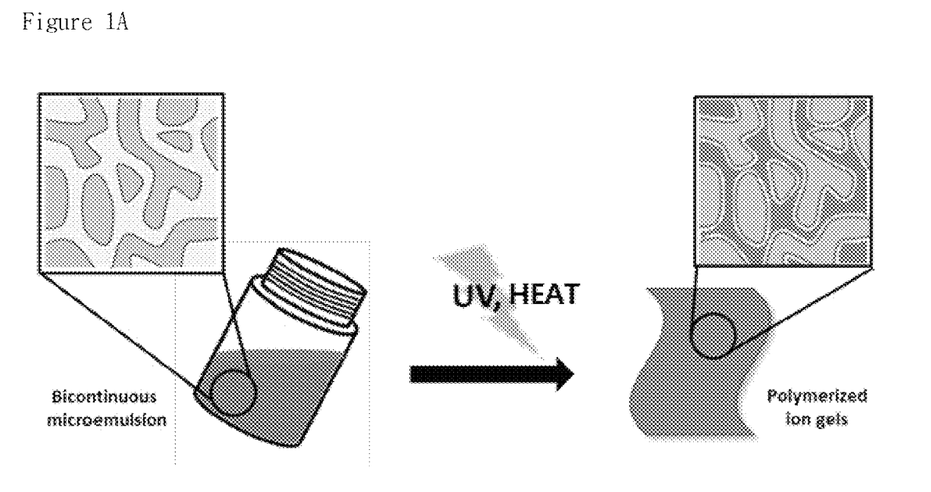
FIG. 1A shows a schematic diagram of a preparation method of a freestanding ion gel according to an embodiment of the present disclosure.
Figure 1B:
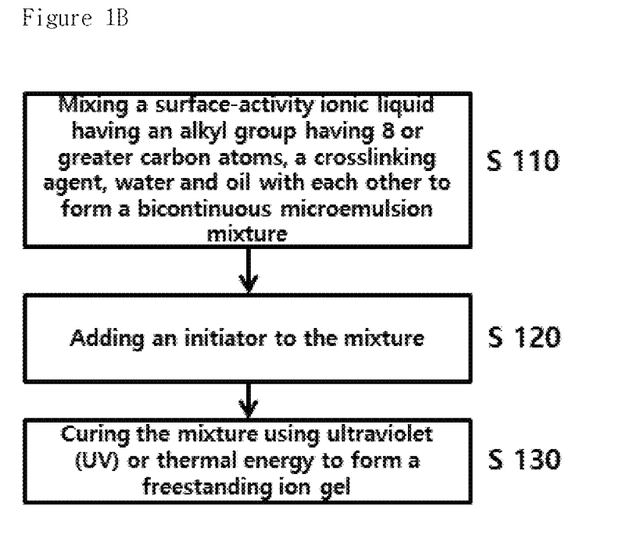
FIG. 1B shows a flow chart of a preparation method of a freestanding ion gel according to an embodiment of the present disclosure.

FIG. 1A is a schematic diagram of a preparation method of a freestanding ion gel according to an embodiment of the present disclosure. FIG. 1B shows a flow chart of a preparation method of a freestanding ion gel according to an embodiment of the present disclosure.

A method for preparing a freestanding ion gel according to an embodiment of the present disclosure includes: i) forming a double-continuous microemulsion mixture containing a surface-activity ionic liquid having an alkyl group having 8 or greater carbon atoms, a crosslinking agent, water and oil (S 110); ii) adding an initiator to the mixture (S120); and iii) forming a freestanding ion gel via UV (Ultraviolet) or thermal curing (S 130).

In step S110, the surface-activity ionic liquid having an alkyl group having 8 or greater carbon atoms, the crosslinking agent, water and oil may be mixed with each other to form the double continuous microemulsion mixture.

In step S110, a surfactant may be additionally included. 1-butanol may be used as an auxiliary surface-activity, but is not limited thereto. As the oil, 1-octene is available.

The surface-activity ionic liquid having an alkyl group having 8 or greater carbon atoms is formed via combinations of following cations and anions. The cation may be based on imidazolium; pyridinium; piperidinium; pyrrolidinium; ammonium; phosphonium; sulfonium. The anion may be chloride; bromide; iodide; hexafluorophosphate; tetrafluoroborate; hexafluoroantimonate; trifluoromethanesulfonate; methyl sulfate; ethyl sulfate; acetate; thiocyanate; dicyanamide; bis(trifluoromethylsulfonyl)amide.

The surface-activity ionic liquid having an alkyl group having 8 or greater carbon atoms is as follows.

[Imidazolium-Based]

1-methyl-3-octylimidazolium chloride; 1-methyl-3-octylimidazolium bromide; 1-methyl-3-octylimidazolium iodide; 1-methyl-3-octylimidazolium hexafluorophosphate; 1-methyl-3-octylimidazolium tetrafluoroborate; 1-methyl-3-octylimidazolium hexafluoroantimonate; 1-methyl-3-octylimidazolium trifluoromethanesulfonate; 1-methyl-3-octylimidazolium methyl sulfate; 1-methyl-3-octylimidazolium ethyl sulfate; 1-methyl-3-octylimidazolium acetate; 1-methyl-3-octylimidazolium thiocyanate; 1-methyl-3-octylimidazolium dicyanamide; 1-methyl-3-octylimidazolium bis(trifluoromethylsulfonyl)amide;

1-octyl-2,3-dimethylimidazolium chloride; 1-octyl-2,3-dimethylimidazolium bromide; 1-octyl-2,3-dimethylimidazolium iodide; 1-octyl-2,3-dimethylimidazolium hexafluorophosphate; 1-octyl-2,3-dimethylimidazolium tetrafluoroborate; 1-octyl-2,3-dimethylimidazolium hexafluoroantimonate; 1-octyl-2,3-dimethylimidazolium trifluoromethanesulfonate; 1-octyl-2,3-dimethylimidazolium methyl sulfate; 1-octyl-2,3-dimethylimidazolium ethyl sulfate; 1-octyl-2,3-dimethylimidazolium acetate; 1-octyl-2,3-dimethylimidazolium thiocyanate; 1-octyl-2,3-dimethylimidazolium dicyanamide; 1-octyl-2,3-dimethylimidazolium bis(trifluoromethylsulfonyl)amide;

1-decyl-3-methylimidazolium chloride; 1-decyl-3-methylimidazolium bromide; 1-decyl-3-methylimidazolium iodide; 1-decyl-3-methylimidazolium hexafluorophosphate; 1-decyl-3-methylimidazolium tetrafluoroborate; 1-decyl-3-methylimidazolium hexafluoroantimonate; 1-decyl-3-methylimidazolium trifluoromethanesulfonate; 1-decyl-3-methylimidazolium methyl sulfate; 1-decyl-3-methylimidazolium ethyl sulfate; 1-decyl-3-methylimidazolium acetate; 1-decyl-3-methylimidazolium thiocyanate; 1-decyl-3-methylimidazolium dicyanamide; 1-decyl-3-methylimidazolium bis(trifluoromethylsulfonyl)amide;

1-dodecyl-3-methylimidazolium chloride; 1-dodecyl-3-methylimidazolium bromide; 1-dodecyl-3-methylimidazolium iodide; 1-dodecyl-3-methylimidazolium hexafluorophosphate; 1-dodecyl-3-methylimidazolium tetrafluoroborate; 1-dodecyl-3-methylimidazolium hexafluoroantimonate; 1-dodecyl-3-methylimidazolium trifluoromethanesulfonate; 1-dodecyl-3-methylimidazolium methyl sulfate; 1-dodecyl-3-methylimidazolium ethyl sulfate; 1-dodecyl-3-methylimidazolium acetate; 1-dodecyl-3-methylimidazolium thiocyanate; 1-dodecyl-3-methylimidazolium dicyanamide; 1-dodecyl-3-methylimidazolium bis(trifluoromethylsulfonyl)amide;

1-tetradecyl-3-methylimidazolium chloride; 1-tetradecyl-3-methylimidazolium bromide; 1-tetradecyl-3-methylimidazolium iodide; 1-tetradecyl-3-methylimidazolium hexafluorophosphate; 1-tetradecyl-3-methylimidazolium tetrafluoroborate; 1-tetradecyl-3-methylimidazolium hexafluoroantimonate; 1-tetradecyl-3-methylimidazolium trifluoromethanesulfonate; 1-tetradecyl-3-methylimidazolium methyl sulfate; 1-tetradecyl-3-m ethylimidazolium ethyl sulfate; 1-tetradecyl-3-methylimidazolium acetate; 1-tetradecyl-3-methylimidazolium thiocyanate; 1-tetradecyl-3-methylimidazolium dicyanamide; 1-tetradecyl-3-methylimidazolium bis(trifluoromethylsulfonyl)amide;

1-hexadecyl-3-methylimidazolium chloride; 1-hexadecyl-3-methylimidazolium bromide; 1-hexadecyl-3-methylimidazolium iodide; 1-hexadecyl-3-methylimidazolium hexafluorophosphate; 1-hexadecyl-3-methylimidazolium tetrafluoroborate; 1-hexadecyl-3-methylimidazolium hexafluoroantimonate; 1-hexadecyl-3-methylimidazolium trifluoromethanesulfonate; 1-hexadecyl-3-methylimidazolium methyl sulfate; 1-hexadecyl-3-methylimidazolium ethyl sulfate; 1-hexadecyl-3-methylimidazolium acetate; 1-hexadecyl-3-methylimidazolium thiocyanate; 1-hexadecyl-3-methylimidazolium dicyanamide; 1-hexadecyl-3-m ethylimidazolium bis(trifluoromethylsulfonyl)amide.

[Pyridinium-Based]

1-methyl-3-octylpyridinium chloride; 1-methyl-3-octyl pyridinium bromide; 1-methyl-3-octylpyridinium iodide; 1-methyl-3-octylpyridinium hexafluorophosphate; 1-methyl-3-octylpyridinium tetrafluoroborate; 1-methyl-3-octylpyridinium hexafluoroantimonate; 1-methyl-3-octylpyridinium trifluoromethanesulfonate; 1-methyl-3-octylpyridinium methyl sulfate; 1-methyl-3-octylpyridinium ethyl sulfate; 1-methyl-3-octylpyridinium acetate; 1-methyl- 3-octylpyridinium thiocyanate; 1-methyl-3-octylpyridinium dicyanamide; 1-methyl-3-octylpyridinium bis(trifluoromethylsulfonyl)amide;

1-octyl-2,3-dimethylpyridinium chloride; 1-octyl-2,3-dimethylpyridinium bromide; 1-octyl-2,3-dimethylpyridinium iodide; 1-octyl-2,3-dimethylpyridinium hexafluorophosphate; 1-octyl-2,3-dimethylpyridinium tetrafluoroborate; 1-octyl-2,3-dimethylpyridinium hexafluoroantimonate; 1-octyl-2,3-dimethylpyridinium trifluoromethanesulfonate; 1-octyl-2,3-dimethylpyridinium methyl sulfate; 1-octyl-2,3-dimethylpyridinium ethyl sulfate; 1-octyl-2,3-dimethylpyridinium acetate; 1-octyl-2,3-dimethylpyridinium thiocyanate; 1-octyl-2,3-dimethylpyridinium dicyanamide; 1-octyl-2,3-dimethylpyridinium bis(trifluoromethylsulfonyl)amide;

1-decyl-3-methylpyridinium chloride; 1-decyl-3-methylpyridinium bromide; 1-decyl-3-methylpyridinium iodide; 1-decyl-3-methylpyridinium hexafluorophosphate; 1-decyl-3-methylpyridinium tetrafluoroborate; 1-decyl-3-methylpyridinium hexafluoroantimonate; 1-decyl-3-methylpyridinium trifluoromethanesulfonate; 1-decyl-3-methylpyridinium methyl sulfate; 1-decyl-3-methylpyridiniumethyl sulfate; 1-decyl-3-methylpyridinium acetate; 1-decyl-3-methylpyridinium thiocyanate; 1-decyl-3-methylpyridinium dicyanamide; 1-decyl-3-methylpyridinium bis(trifluoromethylsulfonyl)amide;

1-dodecyl-3-methylpyridinium chloride; 1-dodecyl-3-methylpyridinium bromide; 1-dodecyl-3-methylpyridinium iodide; 1-dodecyl-3-methylpyridinium hexafluorophosphate; 1-dodecyl-3-methylpyridinium tetrafluoroborate; 1-dodecyl-3-methylpyridinium hexafluoroantimonate; 1-dodecyl-3-methylpyridinium trifluoromethanesulfonate; 1-dodecyl-3-methylpyridinium methyl sulfate; 1-dodecyl-3-methylpyridinium ethyl sulfate; 1-dodecyl-3-methylpyridinium acetate; 1-dodecyl-3-methylpyridinium thiocyanate; 1-dodecyl-3-methylpyridinium dicyanamide; 1-dodecyl-3-methylpyridinium bis(trifluoromethylsulfonyl)amide;

1-tetradecyl-3-methylpyridinium chloride; 1-tetradecyl-3-methylpyridinium bromide; 1-tetradecyl-3-methylpyridinium iodide; 1-tetradecyl-3-methylpyridinium hexafluorophosphate; 1-tetradecyl-3-methylpyridinium tetrafluoroborate; 1-tetradecyl-3-methylpyridinium hexafluoroantimonate; 1-tetradecyl-3-methylpyridinium trifluoromethanesulfonate; 1-tetradecyl-3-methylpyridinium methyl sulfate; 1-tetradecyl-3-methylpyridinium ethyl sulfate; 1-tetradecyl-3-methylpyridinium acetate; 1-tetradecyl-3-methylpyridinium thiocyanate; 1-tetradecyl-3-methylpyridinium dicyanamide; 1-tetradecyl-3-methylpyridinium bis(trifluoromethylsulfonyl)amide;

1-hexadecyl-3-methylpyridinium chloride; 1-hexadecyl-3-methylpyridinium bromide; 1-hexadecyl-3-methylpyridinium iodide; 1-hexadecyl-3-methylpyridinium hexafluorophosphate; 1-hexadecyl-3-methylpyridinium tetrafluoroborate; 1-hexadecyl-3-methylpyridinium hexafluoroantimonate; 1-hexadecyl-3-methylpyridinium trifluoromethanesulfonate; 1-hexadecyl-3-methylpyridinium methyl sulfate; 1-hexadecyl-3-methylpyridinium ethyl sulfate; 1-hexadecyl-3-methylpyridinium acetate; 1-hexadecyl-3-methylpyridinium thiocyanate; 1-hexadecyl-3-methylpyridinium dicyanamide; 1-hexadecyl-3-methylpyridinium bis (trifluoromethylsulfonyl)amide.

[Piperidinium-Based]

1-methyl-3-octylpiperidinium chloride; 1-methyl-3-octylpiperidinium bromide; 1-methyl-3-octylpiperidinium iodide; 1-methyl-3-octylpiperidinium hexafluorophosphate; 1-methyl-3-octylpiperidinium tetrafluoroborate; 1-methyl-3-octylpiperidinium hexafluoroantimonate; 1-methyl-3-octylpiperidinium trifluoromethanesulfonate; 1-methyl-3-octylpiperidinium methyl sulfate; 1-methyl-3-octylpiperidinium ethyl sulfate; 1-methyl-3-octylpiperidinium acetate; 1-methyl-3-octylpiperidinium thiocyanate; 1-methyl-3-octylpiperidinium dicyanamide; 1-methyl-3-octylpiperidinium bis(trifluoromethylsulfonyl)amide;

1-octyl-2,3-dimethylpiperidinium chloride; 1-octyl-2,3-dimethylpiperidinium bromide; 1-octyl-2,3-dimethylpiperidinium iodide; 1-octyl-2,3-dimethylpiperidinium hexafluorophosphate; 1-octyl-2,3-dimethylpiperidinium tetrafluoroborate; 1-octyl-2,3-dimethylpiperidinium hexafluoroantimonate; 1-octyl-2,3-dimethylpiperidinium trifluoromethanesulfonate; 1-octyl-2,3-dimethylpiperidinium methyl sulfate; 1-octyl-2,3-dimethylpiperidinium ethyl sulfate; 1-octyl-2,3-dimethylpiperidinium acetate; 1-octyl-2,3-dimethylpiperidinium thiocyanate; 1-octyl-2,3-dimethylpiperidinium dicyanamide; 1-octyl-2,3-dimethylpiperidinium bis(trifluoromethylsulfonyl)amide;

1-decyl-3-methylpiperidinium chloride; 1-decyl-3-methylpiperidinium bromide; 1-decyl-3-methylpiperidinium iodide; 1-decyl-3-methylpiperidinium hexafluorophosphate; 1-decyl-3-methylpiperidinium tetrafluoroborate; 1-decyl-3-methylpiperidinium hexafluoroantimonate; 1-decyl-3-methylpiperidinium trifluoromethanesulfonate; 1-decyl-3-methylpiperidinium methyl sulfate; 1-decyl-3-methylpiperidinium ethyl sulfate; 1-decyl-3-methylpiperidinium acetate; 1-decyl-3-methylpiperidinium thiocyanate; 1-decyl-3-methylpiperidinium dicyanamide; 1-decyl-3-methylpiperidinium bis(trifluoromethylsulfonyl)amide;

1-dodecyl-3-methylpiperidinium chloride; 1-dodecyl-3-methylpiperidinium bromide; 1-dodecyl-3-methylpiperidinium iodide; 1-dodecyl-3-methylpiperidinium hexafluorophosphate; 1-dodecyl-3-methylpiperidinium tetrafluoroborate; 1-dodecyl-3-methylpiperidinium hexafluoroantimonate; 1-dodecyl-3-methylpiperidinium trifluoromethanesulfonate; 1-dodecyl-3-methylpiperidinium methyl sulfate; 1-dodecyl-3-methylpiperidinium ethylsulfate; 1-dodecyl-3-methylpiperidinium acetate; 1-dodecyl-3-methylpiperidinium thiocyanate; 1-dodecyl-3-methylpiperidinium dicyanamide; 1-dodecyl-3-methylpiperidinium bis(trifluoromethylsulfonyl)amide;

1-tetradecyl-3-methylpiperidinium chloride; 1-tetradecyl-3-methylpiperidinium bromide; 1-tetradecyl-3-methylpiperidinium iodide; 1-tetradecyl-3-methylpiperidinium hexafluorophosphate; 1-tetradecyl-3-methylpiperidinium tetrafluoroborate; 1-tetradecyl-3-methylpiperidinium hexafluoroantimonate; 1-tetradecyl-3-methylpiperidinium trifluoromethanesulfonate; 1-tetradecyl-3-methylpiperidinium methyl sulfate; 1-tetradecyl-3-methylpiperidinium ethyl sulfate; 1-tetradecyl-3-methylpiperidinium acetate; 1-tetradecyl-3-methylpiperidinium thiocyanate; 1-tetradecyl-3-methylpiperidinium dicyanamide; 1-tetradecyl-3-methylpiperidinium bis(trifluoromethylsulfonyl)amide;

1-hexadecyl-3-methylpiperidinium chloride; 1-hexadecyl-3-methylpiperidinium bromide; 1-hexadecyl-3-methylpiperidinium iodide; 1-hexadecyl-3-methylpiperidinium hexafluorophosphate; 1-hexadecyl-3-methylpiperidinium tetrafluoroborate; 1-hexadecyl-3-methylpiperidinium hexafluoroantimonate; 1-hexadecyl-3-methylpiperidinium trifluoromethanesulfonate; 1-hexadecyl-3-methylpiperidinium methyl sulfate; 1-hexadecyl-3-methylpiperidinium ethyl sulfate; 1-hexadecyl-3-methylpiperidinium acetate; 1-hexadecyl-3-methylpiperidinium thiocyanate; 1-hexadecyl-3-methylpiperidinium dicyanamide; 1-hexadecyl-3-methylpiperidinium bis(trifluoromethylsulfonyl)amide.

[Pyrrolidinium-Based]

1-methyl-3-octylpyrrolidinium chloride; 1-methyl-3-octylpyrrolidinium bromide; 1-methyl-3-octylpyrrolidinium iodide; 1-methyl-3-octylpyrrolidinium hexafluorophosphate; 1-methyl-3-octylpyrrolidinium tetrafluoroborate; 1-methyl-3-octylpyrrolidinium hexafluoroantimonate; 1-methyl-3-octylpyrrolidinium trifluoromethanesulfonate; 1-methyl-3-octylpyrrolidinium methyl sulfate; 1-methyl-3-octylpyrrolidinium ethyl sulfate; 1-methyl-3-octylpyrrolidinium acetate; 1-methyl-3-octylpyrrolidinium thiocyanate; 1-methyl-3-octylpyrrolidinium dicyanamide; 1-methyl-3-octylpyrrolidinium bis(trifluoromethylsulfonyl)amide;

1-octyl-2,3-dimethylpyrrolidinium chloride; 1-octyl-2,3-dimethylpyrrolidinium bromide; 1-octyl-2,3-dimethylpyrrolidinium iodide; 1-octyl-2,3-dimethylpyrrolidinium hexafluorophosphate; 1-octyl-2,3-dimethylpyrrolidinium tetrafluoroborate; 1-octyl-2,3-dimethylpyrrolidinium hexafluoroantimonate; 1-octyl-2,3-dimethylpyrrolidinium trifluoromethanesulfonate; 1-octyl-2,3-dimethylpyrrolidinium methyl sulfate; 1-octyl-2,3-dimethylpyrrolidinium ethyl sulfate; 1-octyl-2,3-dimethylpyrrolidinium acetate; 1-octyl-2,3-dimethylpyrrolidinium thiocyanate; 1-octyl-2,3-dimethylpyrrolidinium dicyanamide; 1-octyl-2,3-dimethylpyrrolidinium bis(trifluoromethylsulfonyl)amide;

1-decyl-3-methylpyrrolidinium chloride; 1-decyl-3-methylpyrrolidinium bromide; 1-decyl-3-methylpyrrolidinium iodide; 1-decyl-3-methylpyrrolidinium hexafluorophosphate; 1-decyl-3-methylpyrrolidinium tetrafluoroborate; 1-decyl-3-methylpyrrolidinium hexafluoroantimonate; 1-decyl-3-methylpyrrolidinium trifluoromethanesulfonate; 1-decyl-3-methylpyrrolidinium methyl sulfate; 1-decyl-3-methylpyrrolidinium ethyl sulfate; 1-decyl-3-methylpyrrolidinium acetate; 1-decyl-3-methylpyrrolidinium thiocyanate; 1-decyl-3-methylpyrrolidinium dicyanamide; 1-decyl-3-methylpyrrolidinium bis(trifluoromethylsulfonyl)amide;

1-dodecyl-3-methylpyrrolidinium chloride; 1-dodecyl-3-methylpyrrolidinium bromide; 1-dodecyl-3-methylpyrrolidinium iodide; 1-dodecyl-3-methylpyrrolidinium hexafluorophosphate; 1-dodecyl-3-methylpyrrolidinium tetrafluoroborate; 1-dodecyl-3-methylpyrrolidinium hexafluoroantimonate; 1-dodecyl-3-methylpyrrolidinium trifluoromethanesulfonate; 1-dodecyl-3-methylpyrrolidinium methyl sulfate; 1-dodecyl-3-methylpyrrolidinium ethyl sulfate; 1-dodecyl-3-methylpyrrolidinium acetate; 1-dodecyl-3-methylpyrrolidinium thiocyanate; 1-dodecyl-3-methylpyrrolidinium dicyanamide; 1-dodecyl-3-methylpyrrolidinium bis(trifluoromethylsulfonyl)amide;

1-tetradecyl-3-methylpyrrolidinium chloride; 1-tetradecyl-3-methylpyrrolidinium bromide; 1-tetradecyl-3-methylpyrrolidinium iodide; 1-tetradecyl-3-methylpyrrolidinium hexafluorophosphate; 1-tetradecyl-3-methylpyrrolidinium tetrafluoroborate; 1-tetradecyl-3-methylpyrrolidinium hexafluoroantimonate; 1-tetradecyl-3-methylpyrrolidinium trifluoromethanesulfonate; 1-tetradecyl-3-methylpyrrolidinium methyl sulfate; 1-tetradecyl-3-methylpyrrolidinium ethyl sulfate; 1-tetradecyl-3-methylpyrrolidinium acetate; 1-tetradecyl-3-methylpyrrolidinium thiocyanate; 1-tetradecyl-3-methylpyrrolidinium dicyanamide; 1-tetradecyl-3-methylpyrrolidinium bis(trifluoromethylsulfonyl)amide;

1-hexadecyl-3-methylpyrrolidinium chloride; 1-hexadecyl-3-methylpyrrolidinium bromide; 1-hexadecyl-3-methylpyrrolidinium iodide; 1-hexadecyl-3-methylpyrrolidinium hexafluorophosphate; 1-hexadecyl-3-methylpyrrolidinium tetrafluoroborate; 1-hexadecyl-3-methylpyrrolidinium hexafluoroantimonate; 1-hexadecyl-3-methylpyrrolidinium trifluoromethanesulfonate; 1-hexadecyl-3-methylpyrrolidinium methylsulfate; 1-hexadecyl-3-methylpyrrolidinium ethyl sulfate; 1-hexadecyl-3-methylpyrrolidinium acetate; 1-hexadecyl-3-methylpyrrolidinium thiocyanate; 1-hexadecyl-3-methylpyrrolidinium dicyanamide; 1-hexadecyl-3-methylpyrrolidinium bis(trifluoromethylsulfonyl)amide.

[Ammonium-Based]

1-methyl-3-octylammonium chloride; 1-methyl-3-octylammonium bromide; 1-methyl-3-octylammonium iodide; 1-methyl-3-octylammonium hexafluorophosphate; 1-methyl-3-octylammonium tetrafluoroborate; 1-methyl-3-octylammonium hexafluoroantimonate; 1-methyl-3-octylammonium trifluoromethanesulfonate; 1-methyl-3-octylammonium methyl sulfate; 1-methyl-3-octylammonium ethyl sulfate; 1-methyl-3-octylammonium acetate; 1-methyl-3-octylammonium thiocyanate; 1-methyl-3-octylammonium dicyanamide; 1-methyl-3-octylammonium bis(trifluoromethylsulfonyl)amide;

1-octyl-2,3-dimethylammonium chloride; 1-octyl-2,3-dimethylammonium bromide; 1-octyl-2,3-dimethyl ammonium iodide; 1-octyl-2,3-dimethyl ammonium hexafluorophosphate; 1-octyl-2,3-dimethyl ammonium tetrafluoroborate; 1-octyl-2,3-dimethylammonium hexafluoroantimonate; 1-octyl-2,3-dimethylammonium trifluoromethanesulfonate; 1-octyl-2,3-dimethylammonium methyl sulfate; 1-octyl-2,3-dimethylammonium ethyl sulfate; 1-octyl-2,3-dimethylammonium acetate; 1-octyl-2,3-dimethylammonium thiocyanate; 1-octyl-2,3-dimethylammonium dicyanamide; 1-octyl-2,3-dimethylammonium bis(trifluoromethylsulfonyl)amide;

1-decyl-3-methylammonium chloride; 1-decyl-3-methylammonium bromide; 1-decyl-3-methylammonium iodide; 1-decyl-3-methylammonium hexafluorophosphate; 1-decyl-3-methylammonium tetrafluoroborate; 1-decyl-3-methylammonium hexafluoroantimonate; 1-decyl-3-methylammonium trifluoromethanesulfonate; 1-decyl-3-methylammonium methyl sulfate; 1-decyl-3-methylammonium ethyl sulfate; 1-decyl-3-methylammonium acetate; 1-decyl-3-methylammonium thiocyanate; 1-decyl-3-methylammonium dicyanamide; 1-decyl-3-methylammonium bis(trifluoromethylsulfonyl)amide;

1-dodecyl-3-methylammonium chloride; 1-dodecyl-3-methylammonium bromide; 1-dodecyl-3-methylammonium iodide; 1-dodecyl-3-methylammonium hexafluorophosphate; 1-dodecyl-3-methylammonium tetrafluoroborate; 1-dodecyl-3-methylammonium hexafluoroantimonate; 1-dodecyl-3-methylammonium trifluoromethanesulfonate; 1-dodecyl-3-methyl ammonium methyl sulfate; 1-dodecyl-3-methylammonium ethyl sulfate; 1-dodecyl-3-methylammonium acetate; 1-dodecyl-3-methylammonium thiocyanate; 1-dodecyl-3-methylammonium dicyanamide; 1-dodecyl-3-methylammonium bis(trifluoromethylsulfonyl)amide;

1-tetradecyl-3-methylammonium chloride; 1-tetradecyl-3-methylammonium bromide; 1-tetradecyl-3-methylammonium iodide; 1-tetradecyl-3-methylammonium hexafluorophosphate; 1-tetradecyl-3-methylammonium tetrafluoroborate; 1-tetradecyl-3-methylammonium hexafluoroantimonate; 1-tetradecyl-3-methylammonium trifluoromethanesulfonate; 1-tetradecyl-3-methyl ammonium methyl sulfate; 1-tetradecyl-3-methylammonium ethyl sulfate; 1-tetradecyl-3-methylammonium acetate; 1-tetradecyl-3-methylammonium thiocyanate; 1-tetradecyl-3-methyl ammonium dicyanamide; 1-tetradecyl-3-methylammonium bis(trifluoromethylsulfonyl)amide;

1-hexadecyl-3-methylammonium chloride; 1-hexadecyl-3-methylammonium bromide; 1-hexadecyl-3-methylammonium iodide; 1-hexadecyl-3-methylammonium hexafluorophosphate; 1-hexadecyl-3-methyl ammonium tetrafluoroborate; 1-hexadecyl-3-methylammonium hexafluoroantimonate; 1-hexadecyl-3-methylammonium trifluoromethanesulfonate; 1-hexadecyl-3-methylammonium methyl sulfate; 1-hexadecyl-3-methylammonium ethyl sulfate; 1-hexadecyl-3-methylammonium acetate; 1-hexadecyl-3-methylammonium thiocyanate; 1-hexadecyl-3-methylammonium dicyanamide; 1-hexadecyl-3-methylammonium bis(trifluoromethylsulfonyl)amide.

[Phosphonium-Based]

1-methyl-3-octylphosphonium chloride; 1-methyl-3-octylphosphonium bromide; 1-methyl-3-octylphosphonium iodide; 1-methyl-3-octylphosphonium hexafluorophosphate; 1-methyl-3-octylphosphonium tetrafluoroborate; 1-methyl-3-octylphosphonium hexafluoroantimonate; 1-methyl-3-octylphosphonium trifluoromethanesulfonate; 1-methyl-3-octylphosphonium methyl sulfate; 1-methyl-3-octylphosphonium ethyl sulfate; 1-methyl-3-octylphosphonium acetate; 1-methyl-3-octylphosphonium thiocyanate; 1-methyl-3-octylphosphonium dicyanamide; 1-methyl-3-octylphosphonium bis(trifluoromethylsulfonyl)amide;

1-octyl-2,3-dim ethylphosphonium chloride; 1-octyl-2,3-dim ethylphosphonium bromide; 1-octyl-2,3-dim ethylphosphonium iodide; 1-octyl-2,3-dim ethylphosphonium hexafluorophosphate; 1-octyl-2,3-dimethylphosphonium tetrafluoroborate; 1-octyl-2,3-dimethylphosphonium hexafluoroantimonate; 1-octyl-2,3-dim ethylphosphonium trifluoromethanesulfonate; 1-octyl-2,3-dimethylphosphonium methyl sulfate; 1-octyl-2,3-dimethylphosphonium ethyl sulfate; 1-octyl-2,3-dimethylphosphonium acetate; 1-octyl-2,3-dimethylphosphonium thiocyanate; 1-octyl-2,3-dimethylphosphonium dicyanamide; 1-octyl-2,3-dimethylphosphoniumbis(trifluoromethylsulfonyl)amide;

1-decyl-3-methylphosphonium chloride; 1-decyl-3-methylphosphonium bromide; 1-decyl-3-methylphosphonium iodide; 1-decyl-3-methylphosphonium hexafluorophosphate; 1-decyl-3-methylphosphonium tetrafluoroborate; 1-decyl-3-m ethylphosphonium hexafluoroantimonate; 1-decyl-3-methylphosphonium trifluoromethanesulfonate; 1-decyl-3-methylphosphonium methyl sulfate; 1-decyl-3-methylphosphonium ethyl sulfate; 1-decyl-3-methylphosphonium acetate; 1-decyl-3-m ethylphosphonium thiocyanate; 1-decyl-3-methylphosphonium dicyanamide; 1-decyl-3-m ethylphosphonium bis(trifluoromethylsulfonyl)amide;

1-dodecyl-3-methylphosphonium chloride; 1-dodecyl-3-methylphosphonium bromide; 1-dodecyl-3-m ethylphosphonium iodide; 1-dodecyl-3-m ethylphosphonium hexafluorophosphate; 1-dodecyl-3-m ethylphosphonium tetrafluoroborate; 1-dodecyl-3-methylphosphonium hexafluoroantimonate; 1-dodecyl-3-m ethylphosphonium trifluoromethanesulfonate; 1-dodecyl-3-m ethylphosphonium methyl sulfate; 1-dodecyl-3-methylphosphonium ethylsulfate; 1-dodecyl-3-methylphosphonium acetate; 1-dodecyl-3-methylphosphonium thiocyanate; 1-dodecyl-3-methylphosphonium dicyanamide; 1-dodecyl-3-m ethylphosphonium bis(trifluoromethylsulfonyl)amide;

1-tetradecyl-3-methylphosphonium chloride; 1-tetradecyl-3-methylphosphonium bromide; 1-tetradecyl-3-methylphosphonium iodide; 1-tetradecyl-3-methylphosphonium hexafluorophosphate; 1-tetradecyl-3-methylphosphonium tetrafluoroborate; 1-tetradecyl-3-methylphosphonium hexafluoroantimonate; 1-tetradecyl-3-methylphosphonium trifluoromethanesulfonate; 1-tetradecyl-3-methylphosphonium methylsulfate; 1-tetradecyl-3-methylphosphonium ethyl sulfate; 1-tetradecyl-3-methylphosphonium acetate; 1-tetradecyl-3-methylphosphonium thiocyanate; 1-tetradecyl-3-methylphosphonium dicyanamide; 1-tetradecyl-3-methylphosphonium bis(trifluoromethylsulfonyl)amide;

1-hexadecyl-3-methylphosphonium chloride; 1-hexadecyl-3-methylphosphonium bromide; 1-hexadecyl-3-methylphosphonium iodide; 1-hexadecyl-3-methylphosphonium hexafluorophosphate; 1-hexadecyl-3-methylphosphonium tetrafluoroborate; 1-hexadecyl-3-methylphosphonium hexafluoroantimonate; 1-hexadecyl-3-methylphosphonium trifluoromethanesulfonate; 1-hexadecyl-3-methylphosphonium methyl sulfate; 1-hexadecyl-3-methylphosphonium ethyl sulfate; 1-hexadecyl-3-methylphosphonium acetate; 1-hexadecyl-3-methylphosphonium thiocyanate; 1-hexadecyl-3-methylphosphonium dicyanamide; 1-hexadecyl-3-methylphosphonium bis(trifluoromethylsulfonyl)amide.

[Sulfonium-Based]

1-methyl-3-octylsulfonium chloride; 1-methyl-3-octyl sulfonium bromide; 1-methyl-3-octyl sulfonium iodide; 1-methyl-3-octyl sulfonium hexafluorophosphate; 1-methyl-3-octyl sulfonium tetrafluoroborate; 1-methyl-3-octyl sulfonium hexafluoroantimonate; 1-methyl-3-octyl sulfonium trifluoromethanesulfonate; 1-methyl-3-octyl sulfonium methyl sulfate; 1-methyl-3-octyl sulfonium ethyl sulfate; 1-methyl-3-octyl sulfonium acetate; 1-methyl-3-octyl sulfonium thiocyanate; 1-methyl-3-octyl sulfonium dicyanamide; 1-methyl-3-octyl sulfonium bis(trifluoromethylsulfonyl)amide;

1-octyl-2,3-dimethylsulfonium chloride; 1-octyl-2,3-dimethylsulfonium bromide; 1-octyl-2,3-dimethylsulfonium iodide; 1-octyl-2,3-di methyl sulfonium hexafluorophosphate; 1-octyl-2,3-dimethylsulfonium tetrafluoroborate; 1-octyl-2,3-di methyl sulfonium hexafluoroantimonate; 1-octyl-2,3-di methyl sulfonium trifluoromethanesulfonate; 1-octyl-2,3-di methyl sulfonium methylsulfate; 1-octyl-2,3-di methyl sulfonium ethyl sulfate; 1-octyl-2,3-di methyl sulfonium acetate; 1-octyl-2,3-di methyl sulfonium thiocyanate; 1-octyl-2,3-di methyl sulfonium dicyanamide; 1-octyl-2,3-di methyl sulfonium bis(trifluoromethylsulfonyl)amide;

1-decyl-3-methylsulfonium chloride; 1-decyl-3-methylsulfonium bromide; 1-decyl-3-methyl sulfonium iodide; 1-decyl-3-methyl sulfonium hexafluorophosphate; 1-decyl-3-methyl sulfonium tetrafluoroborate; 1-decyl-3-methyl sulfonium hexafluoroantimonate; 1-decyl-3-methylsulfonium trifluoromethanesulfonate; 1-decyl-3-methyl sulfonium methyl sulfate; 1-decyl-3-methyl sulfonium ethyl sulfate; 1-decyl-3-methyl sulfonium acetate; 1-decyl-3-methyl sulfonium thiocyanate; 1-decyl-3-methyl sulfonium dicyanamide; 1-decyl-3-methyl sulfonium bis(trifluoromethylsulfonyl)amide;

1-dodecyl-3-methylsulfonium chloride; 1-dodecyl-3-methylsulfonium bromide; 1-dodecyl-3-methylsulfonium iodide; 1-dodecyl-3-methylsulfonium hexafluorophosphate; 1-dodecyl-3-methyl sulfonium tetrafluoroborate; 1-dodecyl-3-methyl sulfonium hexafluoroantimonate; 1-dodecyl-3-methyl sulfonium trifluoromethanesulfonate; 1-dodecyl-3-methyl sulfonium methyl sulfate; 1-dodecyl-3-methylsulfonium ethyl sulfate; 1-dodecyl-3-methyl sulfonium acetate; 1-dodecyl-3-methyl sulfonium thiocyanate; 1-dodecyl-3-methyl sulfonium dicyanamide; 1-dodecyl-3-methyl sulfonium bis(trifluoromethylsulfonyl)amide;

1-tetradecyl-3-methyl sulfonium chloride; 1-tetradecyl-3-methyl sulfonium bromide; 1-tetradecyl-3-methyl sulfonium iodide; 1-tetradecyl-3-methyl sulfonium hexafluorophosphate; 1-tetradecyl-3-methyl sulfonium tetrafluoroborate; 1-tetradecyl-3-methyl sulfonium hexafluoroantimonate; 1-tetradecyl-3-methyl sulfonium trifluoromethanesulfonate; 1-tetradecyl-3-methyl sulfonium methyl sulfate; 1-tetradecyl-3-methyl sulfonium ethyl sulfate; 1-tetradecyl-3-methyl sulfonium acetate; 1-tetradecyl-3-methyl sulfonium thiocyanate; 1-tetradecyl-3-methyl sulfonium dicyanamide; 1-tetradecyl-3-methyl sulfonium bis(trifluoromethylsulfonyl)amide;

1-hexadecyl-3-methyl sulfonium chloride; 1-hexadecyl-3-methyl sulfonium bromide; 1-hexadecyl-3-methylsulfonium iodide; 1-hexadecyl-3-methyl sulfonium hexafluorophosphate; 1-hexadecyl-3-methylsulfonium tetrafluoroborate; 1-hexadecyl-3-methyl sulfonium hexafluoroantimonate; 1-hexadecyl-3-methyl sulfonium trifluoromethanesulfonate; 1-hexadecyl-3-methyl sulfonium methyl sulfate; 1-hexadecyl-3-methylsulfonium ethyl sulfate; 1-hexadecyl-3-methyl sulfonium acetate; 1-hexadecyl-3-methyl sulfonium thiocyanate; 1-hexadecyl-3-methyl sulfonium dicyanamide; 1-hexadecyl-3-methyl sulfonium bis(trifluoromethylsulfonyl)amide.

The crosslinking agent may include one selected from a group consisting of di(ethylene glycol) dimethacrylate; di(trimethylolpropane) tetraacrylate; divinylbenzene; ethylene glycol dimethacrylate; trimethylolpropane triacrylate; trimethylolpropane ethoxylate triacrylate; 1,3-butanediol diacrylate 1,4-butanediol diacrylate; 1,3-butanediol dimethacrylate; 1,4-butanediol dimethacrylate; 1,6-hexanediol dimethacrylate; 1,6-hexanediol diacrylate; 1,6-hexanediol ethoxylate diacrylate; 1,10-decanediol dimethacrylate; 1,4-phenylene dimethacrylate; glycerol 1,3-diglycerolate diacrylate; neopentyl glycol diacrylate; and N, N'-methylenebiscacrylamide.

The double continuous microemulsion mixture forms a percolation structure in which all of the ionic conductive domains are connected to each other. This forms a percolation structure in which all ionic conductive domains are connected to each other, as shown in FIG. 1A.

In step S120, the initiator is added to the mixture prepared in step S120.

The initiator may include a photo-initiator and a thermal-initiator.

The photo-initiator may include one selected from a group consisting of 2-hydroxy-2-methylpropiophenone; 2-hydroxy-4'-hydroxyethoxy-2-methylpropiophenone; 1-hydroxycyclohexyl phenyl ketone; 2,2-dimethoxy-2-phenylacetophenone; 2,2-diethoxyacetophenone; 1-hydroxycyclohexyl phenyl ketone; benzophenone; 2-benzyl-2-(dimethylamino)-1-4-(4-morpholinyl)phenyl-1-butanone; diphenyl(2,4,6-trimethylbenzoyl)-phosphine oxide; 2,4,6-trimethylbenzoyl diphenylphosphine oxide; 2,4,6-trimethylbenzoyl-diphenyl phosphinate; and bis(2,4,6-trimethylbenzoyl)-phenyl phosphineoxide.

The thermal-initiator may include one selected from a group consisting of dibenzoyl peroxide; succinic acid peroxide; dilauroyl peroxide; didecanoyl peroxide; t-amyl peroxypivalate; t-butyl peroxypivalate; 2,5-dimethyl-2.5 bis(2-ethyl-hexanoylper oxy) hexane; dibenzoyl peroxide; 4,4'-azobis(4-cyanovaleric acid), 1,1'-azobis(cyclohexane carbonitrile), azobisisobutyronitrile; and 2,2'-azobis (2-methylpropionamidine)dihydrochloride.

In step S130, the freestanding ion gel is formed through curing. The formation process of the freestanding ion gel may be seen FIG. 1A. In FIG. 1a, a left side shows the double continuity microemulsion, and a right side shows a polymerized freestanding ion gel after curing.

The polymerized double-continuous ion gel fabrication technology according to the present disclosure induces a percolation structure in which all ionic conductive domains are connected to each other based on the double-continuous microemulsion structure made of the surface-activity ionic liquid. The free standing ion gel as formed may maintain ion mobility therein. Further, introducing a functional group capable of polymerization into the surface-activity ionic liquid may realize a phase-separation ion gel preparation technology that enhances mechanical strength through a polymer support layer and simultaneously improves ionic conductivity and mechanical strength.

Further, in step S110, a polymerizable ionic liquid into which a functional group is introduced may be additionally added to the mixture to increase the mechanical strength of the ion gel.

The polymerizable ionic liquid into which the functional group is introduced is formed via the combinations of following cations and anions:

The cation may include 1-(2-acryloyloxyundecyl)-3-methylimidazolium; 1-methyl-3-(undec-10-enyl)-imidazolium; 1-(11-acryloyloxyundecyl)-1-methylpyrrolidinium; and 3-(11-acryloyloxyundecyl)-1-ethyl-2-phenyl-imidazolium. The anion may include chloride; bromide; iodide; hexafluorophosphate; tetrafluoroborate; hexafluoroantimonate; trifluoromethanesulfonate; methylsulfate; ethyl sulfate; acetate; thiocyanate; dicyanamide; and bis(trifluoromethylsulfonyl)amide.

The polymerizable ionic liquids with these functional groups are introduced may be listed as follows.

1-(2-acryloyloxyundecyl)-3-methylimidazolium chloride; 1-(2-acryloyloxyundecyl)-3-methylimidazolium bromide; 1-(2-acryloyloxyundecyl)-3-methylimidazolium iodide; 1-(2-acryloyloxyundecyl)-3-methylimidazolium hexafluorophosphate; 1-(2-acryloyloxyundecyl)-3-methylimidazolium tetrafluoroborate; 1-(2-acryloyloxyundecyl)-3-methylimidazolium hexafluoroantimonate; 1-(2-acryloyloxyundecyl)-3-methylimidazolium trifluoromethanesulfonate; 1-(2-acryloyloxyundecyl)-3-methylimidazolium methyl sulfate; 1-(2-acryloyloxyundecyl)-3-methylimidazolium ethyl sulfate; 1-(2-acryloyloxyundecyl)-3-methylimidazolium acetate; 1-(2-acryloyloxyundecyl)-3-methylimidazolium thiocyanate; 1-(2-acryloyloxyundecyl)-3-methylimidazolium dicyanamide; 1-(2-acryloyloxyundecyl)-3-methylimidazolium bis(trifluoromethylsulfonyl)amide;

1-methyl-3-(undec-10-enyl)-imidazolium chloride; 1-methyl-3-(undec-10-enyl)-imidazolium bromide; 1-methyl-3-(undec-10-enyl)-imidazolium iodide; 1-methyl-3-(undec-10-enyl)-imidazolium hexafluorophosphate; 1-methyl-3-(undec-10-enyl)-imidazolium tetrafluoroborate; 1-methyl-3-(undec-10-enyl)-imidazolium hexafluoroantimonate; 1-methyl-3-(undec-10-enyl)-imidazolium trifluoromethanesulfonate; 1-methyl-3-(undec-10-enyl)-imidazolium methylsulfate; 1-methyl-3-(undec-10-enyl)-imidazolium ethyl sulfate; 1-methyl-3-(undec-10-enyl)-imidazolium acetate; 1-methyl-3-(undec-10-enyl)-imidazolium thiocyanate; 1-methyl-3-(undec-10-enyl)-imidazolium dicyanamide; 1-methyl-3-(undec-10-enyl)-imidazolium bis(trifluoromethylsulfonyl)amide;

1-(11-acryloyloxyundecyl)-1-methylpyrrolidinium chloride; 1-(11-acryloyloxyundecyl)-1-methylpyrrolidinium bromide; 1-(11-acryloyloxyundecyl)-1-methylpyrrolidinium iodide; 1-(11-acryloyloxyundecyl)-1-methylpyrrolidinium hexafluorophosphate; 1-(11-acryloyloxyundecyl)-1-methylpyrrolidinium tetrafluoroborate; 1-(11-acryloyloxyundecyl)-1-methylpyrrolidinium hexafluoroantimonate; 1-(11-acryloyloxyundecyl)-1-methylpyrrolidinium trifluoromethanesulfonate; 1-(11-acryloyloxyundecyl)-1-methylpyrrolidinium methyl sulfate; 1-(11-acryloyloxyundecyl)-1-methylpyrrolidinium ethyl sulfate; 1-(11-acryloyloxyundecyl)-1-methylpyrrolidinium acetate;

1-(11-acryloyloxyundecyl)-1-methylpyrrolidinium thiocyanate; 1-(11-acryloyloxyundecyl)-1-methylpyrrolidinium dicyanamide; 1-(11-acryloyloxyundecyl)-1-methylpyrrolidinium bis(trifluoromethylsulfonyl)amide;

3-(11-acryloyloxyundecyl)-1-ethyl-2-phenyl-imidazolium chloride; 3-(11-acryloyloxyundecyl)-1-ethyl-2-phenyl-imidazolium bromide; 3-(11-acryloyloxyundecyl)-1-ethyl-2-phenyl-imidazolium iodide; 3-(11-acryloyloxyundecyl)-1-ethyl-2-phenyl-imidazolium hexafluorophosphate; 3-(11-acryloyloxyundecyl)-1-ethyl-2-phenyl-imidazolium tetrafluoroborate; 3-(11-acryloyloxyundecyl)-1-ethyl-2-phenyl-imidazolium hexafluoroantimonate; 3-(11-acryloyloxyundecyl)-1-ethyl-2-phenyl-imidazolium trifluoromethanesulfonate; 3-(11-acryloyloxyundecyl)-1-ethyl-2-phenyl-imidazolium methyl sulfate; 3-(11-acryloyloxyundecyl)-1-ethyl-2-phenyl-imidazolium ethyl sulfate; 3-(11-acryloyloxyundecyl)-1-ethyl-2-phenyl-imidazolium acetate; 3-(11-acryloyloxyundecyl)-1-ethyl-2-phenyl-imidazolium thiocyanate; 3-(11-acryloyloxyundecyl)-1-ethyl-2-phenyl-imidazolium dicyanamide; 3-(11-acryloyloxyundecyl)-1-ethyl-2-phenyl-imidazolium bis(trifluoromethylsulfonyl)amide.

The mechanical strength of the ion gel increases as a content of the polymerizable ionic liquid into which such a functional group is introduced increases.

Hereinafter, the present disclosure will be additionally described with specific Example.

[Example 1]

FIG. 1A is a schematic diagram of preparation of a polymerized double-continuous ion gel. The left shows a double-continuous microemulsion mixture composed of the surface-activity ionic liquid 1-tetradecyl-3-methylimidazolium chloride ($C_{14}$MIm.Cl), the crosslinking agent 6-hexanediol diacrylate (HDODA), 1-butanol, 1-octene as an oil, and water. After adding the photo-initiator 2-hydroxy-2-methylpropiophenone to this mixture, the freestanding ion gel may be prepared through UV curing. The prepared freestanding ion gel is shown on the right. Further, in order to increase the mechanical strength of the ion gel, a polymerizable ionic liquid 1-(2-acryloyloxyundecyl)-3-methylimidazolium bromide (A-$C_{11}$MIm.Br) to which an acrylate functional group is introduced is added into the ion gel.

Figure 2:
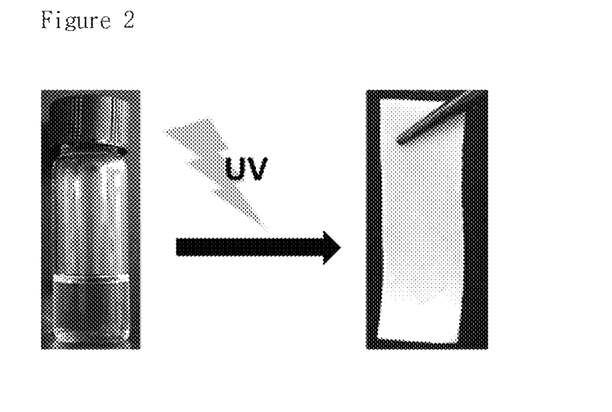
FIG. 2 is a photograph of an optically transparent double-continuous microemulsion and a freestanding ion gel completed via UV curing.

FIG. 2 is a photograph of an optically transparent double-continuous microemulsion and a freestanding ion gel completed through UV curing. The finished freestanding ion gel may be produced while changing the molar ratio ($\gamma$) of A-$C_{11}$MIm.Br to the total ionic liquid ($C_{14}$MIm.Cl+A-$C_{11}$MIm.Br). The introduction of the ionic liquid A-$C_{11}$MIm.Br capable of polymerization provides the effect of enhancing the mechanical strength of the ion gel.

Figure 3:
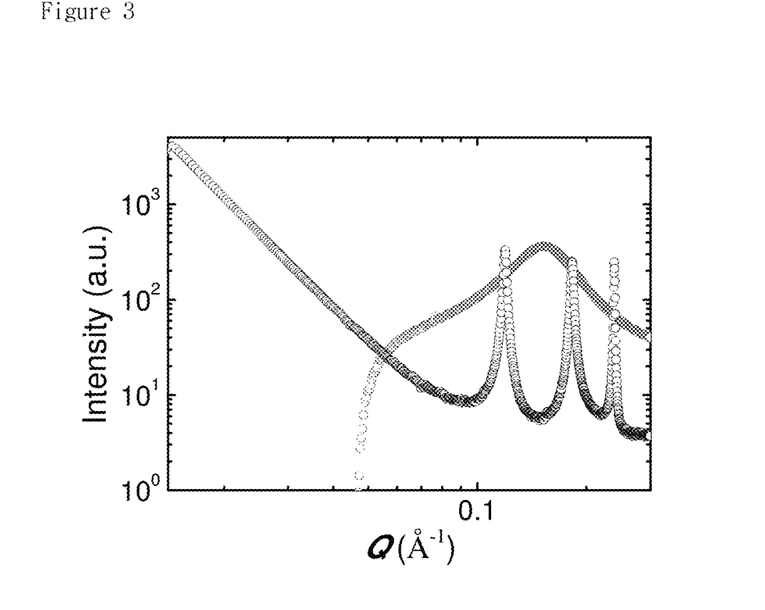
FIG. 3 shows small-angle X-ray scattering data of a bicontinuous microemulsion (gray) and a freestanding ion gel (black) according to the present disclosure.

Small-angle X-ray scattering experiment was conducted to identify an internal structure of the ion gel polymerized via the self-assembled ionic liquid. In FIG. 3, the small-angle X-ray scattering data before (gray) and after (black) UV curing of the mixture composed of the surface-activity ionic liquid $C_{14}$MIm.Cl curing are shown.

It was confirmed that the mixture before the UV curing had a peak of the double continuous microemulsion at 0.15 Å$^{-1}$. In the freestanding ion gel formed after the UV curing, there were strong peaks in a high Q region, 0.12 Å$^{-1}$, 0.18 Å$^{-1}$, and 0.24 Å$^{-1}$. Thus, it was confirmed that interconnected ion channels having a size of several nm were formed on a large area. A relative position of the 0.24 Å$^{-1}$ peak is twice the 0.12 Å$^{-1}$. As a result, a lamellar structure ion channel of about 52.7 Å may be expected. The 0.18 Å$^{-1}$ peak refers to an ion channel having a microemulsion structure of 34.3 Å, Thus, it was confirmed that two types of ion channels, that is, lamellar and microemulsion structures coexist within the ion gel.

Figure 4:
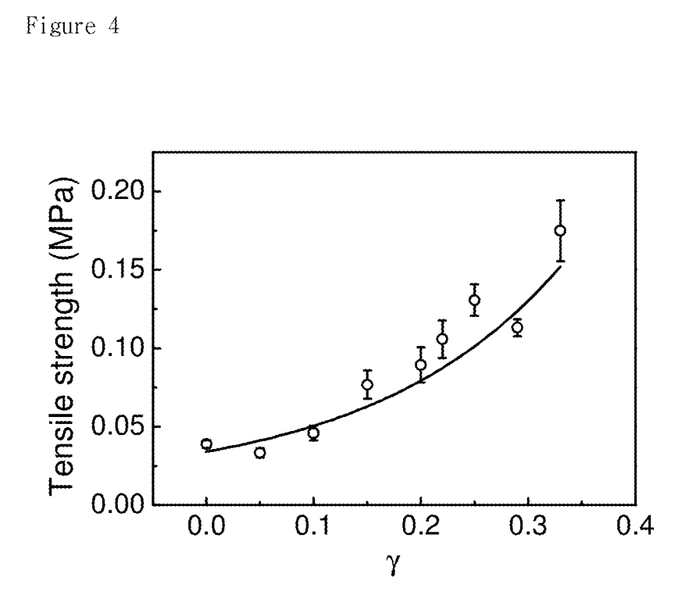
FIG. 4 shows an ultimate tensile strength of a freestanding ion gel according to the present disclosure based on a molar ratio ($\gamma$) of A-$C_{11}$MIm.Br to a total ionic liquid ($C_{14}$MIm.Cl+A-$C_{11}$MIm.Br).

To check the mechanical strength of the freestanding ion gel, the experiment was carried out to measure the ultimate tensile strength of the ion gel based on the molar ratio ($\gamma$) of A-$C_{11}$MIm.Br to the total ionic liquid ($C_{14}$MImCl+A-$C_{11}$MIm.Br) as shown in FIG. 4.

In this connection, when A-$C_{11}$MIm.Br was not added, it showed a weak tensile strength of 0.04 MPa. However, when the molar ratio of A-$C_{11}$MIm.Br thereto was increased to 0.33, it was confirmed that the tensile strength of the ion gel increased by more than 4 times and thus became to 0.17 MPa. Based on a result of the experiment, it was confirmed that the mechanical strength of the ion gel increased as the content of the polymerizable ionic liquid A-$C_{11}$MIm.Br was increased.

Figure 5:
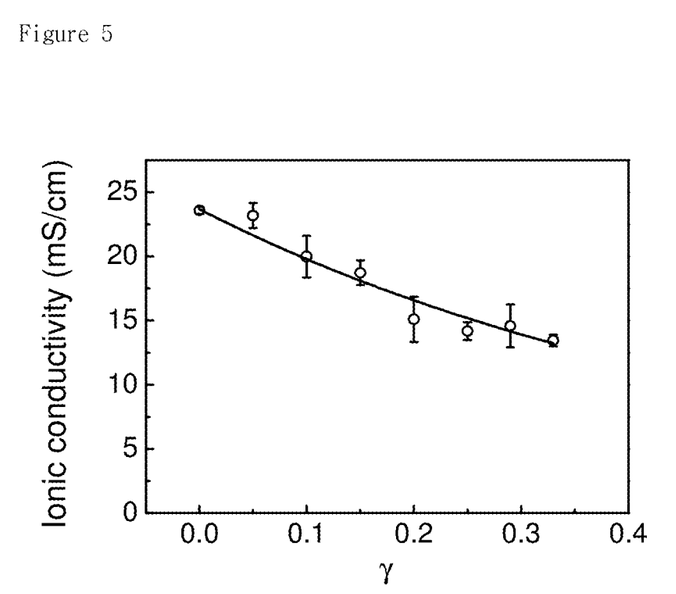
FIG. 5 shows a ionic conductivity at 33° C. of a freestanding ion gel according to the present disclosure based on a molar ratio ($\gamma$) of A-$C_{11}$MIm Br to a total ionic liquid ($C_{14}$MIm.Cl+A-$C_{11}$MIm.Br).

At the same time, an experiment was conducted to measure the ionic conductivity of the ion gel at 33° C. based on the molar ratio ($\gamma$) of A-$C_{11}$MIm.Br to the total ionic liquid ($C_{14}$MIm.Cl+A-$C_{11}$MIm.Br). This result was summarized as shown in FIG. 5. When A-$C_{11}$MIm.Br was not added, the ionic conductivity of 24 mS/cm was shown. However, when A-$C_{11}$MIm.Br was added thereto, the ionic conductivity of the ion gel was decreased. However, when the molar ratio of A-$C_{11}$MIm.Br was further increased, the reduction of the ionic conductivity of the ion gel gradually decreased. Thus, the high ionic conductivity ion gel with high mechanical strength may be formed via the introduction of the polymerizable ionic liquid. This ion gel may be applied to the solid electrolyte.

Description of the presented embodiments is provided so that a person having ordinary skill in the technical field according to the present disclosure may use or implement the present disclosure. Various modifications to these embodiments will be apparent to those of ordinary skill in the technical field according to the present disclosure. The general principles defined herein may be applied to other embodiments without departing from the scope according to the present disclosure. Thus, the present disclosure is not limited to the embodiments presented herein, but should be interpreted in the widest scope consistent with the principles and novel features presented herein.

What is claimed is:

1. A method for preparing a freestanding ion gel, the method comprising:
   i) mixing a surface-activity ionic liquid having an alkyl group having 8 or greater carbon atoms, a crosslinking agent, water and oil with each other to form a bicontinuous microemulsion mixture;
   ii) adding an initiator to the mixture; and
   iii) curing the mixture using ultraviolet (UV) or thermal energy to form a freestanding ion gel,
   wherein the surface-activity ionic liquid includes a combination of a cation and an anion, and
   wherein the anion is selected from the group consisting of hexafluoroantimonate; methylsulfate; ethylsulfate; acetate; and bis(trifluoromethylsulfonyl)amide.

2. The method of claim 1, wherein i) further includes adding a surfactant to the mixture.

3. The method of claim 1, wherein the bicontinuous microemulsion mixture forms a percolation structure in which all of ion conductive domains are connected to each other.

4. The method of claim 1,
   wherein the cation is selected from the group consisting of an imidazolium-based cation; a pyridinium-based cation; a piperidinium-based cation; a pyrrolidinium-based cation; an ammonium-based cation; a phosphonium-based cation; and a sulfonium-based cation.

5. The method of claim 1, wherein the crosslinking agent is selected from the group consisting of di(ethylene glycol) dimethacrylate; di(trimethylolpropane) tetraacrylate; divinylbenzene; ethylene glycol dimethacrylate; trimethylolpropane triacrylate;
trimethylolpropane ethoxylate triacrylate; 1,3-butanediol diacrylate 1,4-butanediol diacrylate; 1,3-butanediol dimethacrylate; 1,4-butanediol dimethacrylate; 1,6-hexanediol dimethacrylate; 1,6-hexanediol diacrylate; 1,6-hexanediol ethoxylate diacrylate; 1,10-decanediol dimethacrylate; 1,4-phenylene dimethacrylate; glycerol 1,3-diglycerolate diacrylate; neopentyl glycol diacrylate; and N, N'-methylenebiscacrylamide.

6. The method of claim 1, wherein i) further includes adding, to the mixture, a polymerizable ionic liquid having a functional group introduced thereto, thereby to improve mechanical strength of the freestanding ion gel.

7. The method of claim 4, wherein the polymerizable ionic liquid having the functional group introduced thereto includes a combination of a cation and an anion,
wherein the cation is selected from the group consisting of 1-(2-acryloyloxyundecyl)-3-methylimidazolium; 1-methyl-3-(undec-10-enyl)-imidazolium; 1-(11-acryloyloxyundecyl)-1-methylpyrrolidinium; and 3-(11-acryloyloxyundecyl)-1-ethyl-2-phenyl-imidazolium.

8. The method of claim 1, wherein the initiator includes a photo-initiator or a thermal-initiator,
wherein the photo-initiator is selected from the group consisting of 2-hydroxy-2-methylpropiophenone; 2-hydroxy-4'-hydroxyethoxy-2-methylpropiophenone; 1-hydroxycyclohexyl phenyl ketone; 2,2-dimethoxy-2-phenylacetophenone; 2,2-diethoxyacetophenone; 1-hydroxycyclohexyl phenyl ketone; benzophenone; 2-benzyl-2-(dimethylamino)-1-4-(4-morpholinyl)phenyl-1-butanone; diphenyl(2,4,6-trimethylbenzoyl)-phosphine oxide; 2,4,6-trimethylbenzoyl diphenylphosphine oxide; 2,4,6-trimethylbenzoyl-diphenyl phosphinate; and bis(2,4,6-trimethylbenzoyl)-phenyl phosphineoxide, and
wherein the thermal-initiator is selected from the group consisting of dibenzoyl peroxide; succinic acid peroxide; dilauroyl peroxide; didecanoyl peroxide; t-amyl peroxypivalate; t-butyl peroxypivalate; 2,5-dimethyl-2.5 bis(2-ethyl-hexanoylper oxy) hexane; dibenzoyl peroxide; 4,4'-azobis(4-cyanovaleric acid), 1,1'-azobis (cyclohexane carbonitrile), azobisisobutyronitrile; and 2,2'-azobis (2-methylpropionamidine)dihydrochloride.

9. A freestanding ion gel prepared using the method of claim 1.

10. A solid electrolyte containing a freestanding ion gel prepared using the method of claim 1.

11. A method for preparing a freestanding ion gel, the method comprising:
i) mixing 1-tetradecyl-3-methylimidazolium chloride as a surface-activity ionic liquid, 6-hexanediol diacrylate as a crosslinking agent, 1-butanol, 1-octene as an oil, and water with each other to form a bicontinuous microemulsion mixture;
ii) adding 2-hydroxy-2-methylpropiophenone as a photo-initiator to the mixture; and
iii) curing the mixture using ultraviolet (UV) curing to form a freestanding ion gel.

12. The method of claim 11, wherein i) further includes adding, to the mixture, a polymerizable ionic liquid having a functional group introduced thereto, thereby to improve mechanical strength of the freestanding ion gel, wherein the polymerizable ionic liquid having the functional group introduced thereto includes 1-(2-acryloyloxyundecyl)-3-methylimidazolium bromide.

13. A method for preparing a freestanding ion gel, the method comprising:
i) mixing a surface-activity ionic liquid having an alkyl group having 8 or greater carbon atoms, a crosslinking agent, water and oil with each other to form a bicontinuous microemulsion mixture;
ii) adding an initiator to the mixture; and
iii) curing the mixture using ultraviolet (UV) or thermal energy to form a freestanding ion gel,
wherein the surface-activity ionic liquid includes a combination of a cation and an anion, and
wherein the cation is selected from the group consisting of 1-(11-acryloyloxyundecyl)-1-methylpyrrolidinium; and 3-(11-acryloyloxyundecyl)-1-ethyl-2-phenyl-imidazolium.

14. The method of claim 13, wherein i) further includes adding a surfactant to the mixture.

15. The method of claim 13, wherein the anion is selected from the group consisting of chloride; bromide; iodide; hexafluorophosphate; tetrafluoroborate; hexafluoroantimonate; trifluoromethanesulfonate; methylsulfate; ethylsulfate; acetate; thiocyanate; dicyanamide; and bis(trifluoromethylsulfonyl)amide.

16. The method of claim 13, wherein the crosslinking agent is selected from the group consisting of di(ethylene glycol) dimethacrylate; di(trimethylolpropane) tetraacrylate; divinylbenzene; ethylene glycol dimethacrylate; trimethylolpropane triacrylate; trimethylolpropane ethoxylate triacrylate; 1,3-butanediol diacrylate 1,4-butanediol diacrylate; 1,3-butanediol dimethacrylate; 1,4-butanediol dimethacrylate; 1,6-hexanediol dimethacrylate; 1,6-hexanediol diacrylate; 1,6-hexanediol ethoxylate diacrylate; 1,10-decanediol dimethacrylate; 1,4-phenylene dimethacrylate; glycerol 1,3-diglycerolate diacrylate; neopentyl glycol diacrylate; and N, N'-methylenebiscacrylamide.

17. The method of claim 13, wherein i) further includes adding, to the mixture, a polymerizable ionic liquid having a functional group introduced thereto, thereby to improve mechanical strength of the freestanding ion gel.

18. The method of claim 13, wherein the initiator includes a photo-initiator or a thermal-initiator,
wherein the photo-initiator is selected from the group consisting of 2-hydroxy-2-methylpropiophenone; 2-hydroxy-4'-hydroxyethoxy-2-methylpropiophenone; 1-hydroxycyclohexyl phenyl ketone; 2,2-dimethoxy-2-phenylacetophenone; 2,2-diethoxyacetophenone; 1-hydroxycyclohexyl phenyl ketone; benzophenone; 2-benzyl-2-(dimethylamino)-1-4-(4-morpholinyl)phenyl-1-butanone; diphenyl(2,4,6-trimethylbenzoyl)-phosphine oxide; 2,4,6-trimethylbenzoyl diphenylphosphine oxide; 2,4,6-trimethylbenzoyl-diphenyl phosphinate; and bis(2,4,6-trimethylbenzoyl)-phenyl phosphineoxide,
wherein the thermal-initiator is selected from the group consisting of dibenzoyl peroxide; succinic acid peroxide; dilauroyl peroxide; didecanoyl peroxide; t-amyl peroxypivalate; t-butyl peroxypivalate; 2,5-dimethyl-2.5 bis(2-ethyl-hexanoylper oxy) hexane; dibenzoyl peroxide; 4,4'-azobis(4-cyanovaleric acid), 1,1'-azobis (cyclohexane carbonitrile), azobisisobutyronitrile; and 2,2'-azobis (2-methylpropionamidine)dihydrochloride.

19. A freestanding ion gel prepared using the method of claim 13.

20. A solid electrolyte containing a freestanding ion gel prepared using the method of claim 13.

* * * * *